(12) United States Patent
D'Alpaos

(10) Patent No.: US 11,274,186 B2
(45) Date of Patent: Mar. 15, 2022

(54) RIGID POLYMER FOAM

(71) Applicant: DIAB International AB, Laholm (SE)

(72) Inventor: Mario D'Alpaos, Belluno (IT)

( * ) Notice: Subject to any disclaimer, the term of this patent is extended or adjusted under 35 U.S.C. 154(b) by 30 days.

(21) Appl. No.: 16/600,733

(22) Filed: Oct. 14, 2019

(65) Prior Publication Data

US 2020/0123342 A1 Apr. 23, 2020

(30) Foreign Application Priority Data

Oct. 23, 2018 (IT) ........................ 102018000009695

(51) Int. Cl.
*C08J 9/36* (2006.01)

(52) U.S. Cl.
CPC .............. *C08J 9/36* (2013.01); *C08J 2205/05* (2013.01); *C08J 2205/10* (2013.01); *C08J 2367/02* (2013.01)

(58) Field of Classification Search
CPC ...... C08J 9/36; C08J 2205/05; C08J 2205/10; C08J 2367/02; C08J 2205/052; C08J 2463/00; C08J 9/42; C08J 9/00; B29K 105/046; B29K 2067/003; B32B 2603/00; B32B 2605/18; B32B 2266/08; B32B 2266/0264; B32B 2260/021; B32B 2260/046; B32B 2255/102; B32B 2255/26; B32B 2250/03; B32B 2250/40; B32B 5/02; B32B 5/18; B32B 5/245; B29C 44/5654

See application file for complete search history.

(56) References Cited

U.S. PATENT DOCUMENTS

| 2012/0232175 | A1* | 9/2012 | Lindenfelzer ........... B29C 48/10 521/79 |
| 2015/0125686 | A1* | 5/2015 | Rakutt ...................... B32B 5/20 428/314.4 |
| 2016/0016339 | A1* | 1/2016 | Lavoie ................ B29C 44/5681 428/304.4 |
| 2017/0369667 | A1 | 12/2017 | Ruckdäschel |

FOREIGN PATENT DOCUMENTS

| DE | 102006056612 | 5/2008 |
| EP | 1967345 | 9/2008 |

* cited by examiner

*Primary Examiner* — Kara B Boyle
(74) *Attorney, Agent, or Firm* — Themis Law

(57) ABSTRACT

A rigid polymer foam having specific characteristics in terms of resin absorption, and a structural element made from such rigid polymer foam and adapted to be used as a core layer in a multilayer structural element.

11 Claims, 4 Drawing Sheets

RIGID POLYMER FOAM

FIELD OF THE INVENTION

The present invention relates to a rigid closed-cell polymer foam.

The technical field of the present invention falls within the field of expanded polymer materials or rigid polymer foams, in particular flat structural elements, such as plates, panels or sheets, of expanded PET polymer materials.

More specifically, reference is made to polymer foams obtained by continuous extrusion or by free or forced expansion molding, starting from thermoplastic polymers, possibly modified with chemical or physical expanding agents, nucleating agents, charge extenders, stabilizers, cross-linkers.

BACKGROUND OF THE INVENTION

It is known that when a polymer foam is produced, in particular a PET foam, the polymer is mixed with various additives, among which expanding agents, by means, for example, of a continuous extrusion process, which produces a continuous panel of cellular foam which appears as a non-flat surface film or skin, which must be removed by means of suitable treatment to obtain a cell foam, i.e. a foam with an exposed cellularity which allows subsequent adhesion by the gripping of resins to the surface of the polymer foam element. When the cells have excessively large dimensions, however, the absorption of resin by the expanded polymer foam element can be excessive.

Treatment with adhesive or laminating resins is important, as the laminate or composite (foam+resin+reinforcing fibers) is the finished product which is used, for example, in naval, aerospace applications, wind turbines, etc. and the characteristics of the surface of the polymer foam element, especially flat plate, are of fundamental importance for the characteristics of the finished product, in particular for minimizing the absorption of the resin, which can only penetrate the open cells present on the surface and wherein the quantity of resin absorbed depends on the availability of open volume on the surface.

It is therefore important for the polymer foam to have open cells on the surface exposed to allow the physical gripping of the resin; if the open volume on the surface is too high, however, the resin absorption becomes excessive, leading only to a weight increase for the laminate or composite element, produced with said rigid polymer foams, and, on the contrary, no longer providing any positive effect with respect to the adhesion of the resin, completely compromising the purpose of lightening to be achieved by inserting a light polymeric foam inside a laminate.

The state of the art has faced this problem and, for example, U.S. Pat. No. 8,722,751 specifically discloses that the reduction in the dimensions of the cells involves a reduction in the resin absorption.

U.S. patent publication no. 2015/0125686, on the contrary, discloses a hot wire cutting process which involves sealing the cells (due to their melting) which is reflected in a reduction in the resin absorption.

U.S. patent publication no. 2016/0001633 also discloses that a surface melting process by pressure and temperature action, through a hot plate, leads to the sealing of the surface of the foam with a consequent reduction in the resin absorption.

In the case of PET foams, however, a reduction in the cell dimension to values ≤0.6 mm is difficult to reach with the processes currently in use, both technically and economically, as it is necessary to operate at high pressures and significantly lower the temperatures: the relative plants are in fact expensive at a project level and have higher energy consumptions.

Furthermore, the sealing of the surface cells as an alternative solution to the problem previously indicated, involves a reduction in the mechanical gripping of the resin to the foam with a consequent reduction in the resin adhesion.

The sealing control is, in fact, extremely complicated, requiring specific machinery and resulting, however, in an insufficient adhesion of the resin, in the case of excessive sealing of the surface.

SUMMARY OF THE INVENTION

The objective of the present invention is to identify a rigid polymer foam which overcomes the drawbacks indicated above, in particular having a surface which is such as to guarantee a good mechanical gripping and therefore an optimum adhesion of the resins subsequently applied, but that at the same time only absorbs the necessary amount of resin.

The object of the present invention therefore relates to a rigid polymer foam having an average dimension of the depth of the openings present on the surface of the polymer foam not higher than the average cell dimension of the foam, expressed as average diameter of the cells determined according to ISO28962001EANNEXA.

The extruded and expanded polymer material of the polymer foams according to the present invention is preferably polyethylene terephthalate (PET).

The rigid polymer foam according to the present invention preferably has an exposed cellularity which is such that the average dimension of the depth of the openings present on the surface of the polymer foam is smaller than the average dimension of the cell itself, expressed as average diameter determined according to ISO2896:2001EANNEXA.

An object of the present invention also relates to a structural element suitable for being used as a core layer in a multilayer structural element, wherein said structural element is made of rigid polymer foam, wherein the surface of said foam, preferably charged by infusion, with a resin and with reinforcement fibers, has an average dimension of the depth of the openings present on the surface of the polymer foam, smaller than the dimension of the cell itself, expressed as average diameter according to ISO2896:2001EANNEXA.

It has also been found that, obtaining the structural element of the rigid polymer foam according to the present invention from an expanded extruded polymer block by means of a final processing or surface finishing treatment, carried out by processing the cell surface of the expanded polymer with a high cutting precision, without tearing, keeping the surface cells intact, it is possible to obtain a structural element of rigid polymer foam that absorbs less resin, maintaining however optimum characteristics of mechanical adhesion.

The surface of the polymer foam obtained with the above-mentioned cutting method, wherein the surface of an element made of expanded polymeric material is processed with high precision, without tearing or entrainment, involves the exposure of a certain and precise quantity of surface openings corresponding to the sectioning of the superficial cells. This precision has a positive effect on the reduction of the roughness and a greater surface uniformity which leads to a decrease in the absorption of the resins, whereas a certain number of open surface cells remains, which ensures the mechanical adhesion of the same resins, with an average size of the openings present on the surface of the polymer foam, not higher and preferably lower than the size of the cell itself, expressed as average diameter.

Thus the exposed surface, concept absolutely clear for the skilled person in the art also in view of the above indications, is the surface of the continuous panel of cellular foam submitted to the specific treatments directed to remove the non-flat surface film or skin, to obtain a cell foam, i.e. a foam panel or element with a surface with an exposed cellularity, i.e. the so called exposed surface. It is thus the surface submitted to the surface finishing methods that in the case of the present invention are treatments like cuts with knives and then the resin infusion.

This surface finishing method uses cuts with movable knives, ultrasound devices, linear or circular sharp blades, and has proved to be particularly advantageous compared to hot-wire cutting or serrated saw blade cutting techniques or with respect to sandpaper technologies for removing the material from the surface of the expanded polymer, allowing a rigid polymer foam to be obtained, with a particularly smooth surface and consequently a homogeneous absorption thickness of the resin and reduced to the value required for the application for which it is destined, minimizing processing scraps.

The above-mentioned treatment is in fact particularly advantageous in that it allows a rigid polymer foam to be obtained, having a high cell size which, thanks to the reduced surface roughness due to the absence of abrasions and tears in the finishing treatment, has in any case a reduced resin absorption.

The surface of rigid polymer foam according to the present invention does not present any pore closed by hot treatment to decrease the surface roughness: it is a surface with a particularly smooth surface wherein the reduced absorption of the resin is obtained thanks to the feature that the surface has an exposed cellularity which is such that the average dimension of the depth of the openings present on the surface of the polymer foam is not greater than or preferably smaller than the average dimension of the cell itself, expressed as average diameter determined according to ISO2896:2001EANNEXA.

The laminating resins preferably used in the structural element according to the present invention are selected from polyester resins, vinyl ester resins, epoxy resins or phenolic resins.

The density of the rigid polymer foam according to the present invention ranges from 30 to 400 $Kg/m^3$, preferably from 60-250 $Kg/m^3$.

The density was measured according to ISO845 (2006).

The cell dimensions of the rigid polymer foam according to the present invention range from 0.05 to 2 mm, preferably from 0.1 to 1 mm and are even more preferably equal to 0.6 mm.

The cell size was measured according to ISO2896:2001EANNEXA.

The measurements performed for evaluating the surface quality, i.e. for evaluating the surface roughness/homogeneity before the absorption of resins, and for evaluating the thickness of the absorbed resin, were carried out with an optical microscope with a camera with integrated software for detecting the measurements on 10× magnification images.

The measurements of the average depth of the openings present on the surface of the polymer foam namely the evaluation of the surface roughness/homogeneity, i.e. the surface quality is carried out with an optical microscope with a camera with integrated software for detecting the measurements on 10× magnification images: the measurement of the average depth of the openings present on the surface of the polymer foam is a statistical average of the linear measure expressed in mm, measured in the 10× magnification image of a surface section, for example of a surface section of 5 $mm^2$.

The thickness of the infused/absorbed resin, penetrating inside the surface free volume, is a linear measure expressed in mm, corresponding to the average value measured in the 10× magnification image of a surface section submitted to the resin infusion.

The thickness of the infused resin primarily depends on the characteristics of the surface of the rigid polymer foam and specifically on the depth of the openings on the surface of the polymer foam lower than the size of the cell itself, expressed as the average diameter determined according to ISO2896: 2001EANNEXA.

The thickness of the infused resin also depends on the final processing treatment or surface finishing.

In particular, the polymer foam can be obtained by the processes described in international application publications WO1998051467, WO2007141647 or EP2002027251.

The rigid polymer foam according to the present invention, very surprisingly, has the advantage of absorbing a reduced amount of resin, while maintaining a high average cellularity dimension, but with an average surface depth not higher than the average cell diameter.

More specifically, the rigid polymer foam according to the present invention is characterized by a surface finish quality without tearing or entrainment, which ensures an improved wettability, with a contact angle of less than 105°, such that the average penetration depth of the resin in the surface of the polymer foam according to the present invention is not higher than the cell size, expressed as average diameter.

The rigid polymer foam according to the invention has a resin absorption on the surface which ranges from 450 to 600 $g/m^2$.

The solution according to the present invention therefore solves the technical problem faced, without providing additional processes, without compromising the mechanical adhesion due to an excessive sealing of the surface cells and with a simple solution that does not require, for example, the substitution of costly extrusion plants for exerting a high pressure, required for nucleation in small cells.

BRIEF DESCRIPTION OF THE DRAWINGS

These and other objectives, advantages and characteristics appear from the following non-limiting examples, and from the figures of the attached drawings, in which.

DETAILED DESCRIPTION OF EMBODIMENTS OF THE INVENTION

Figure 1:
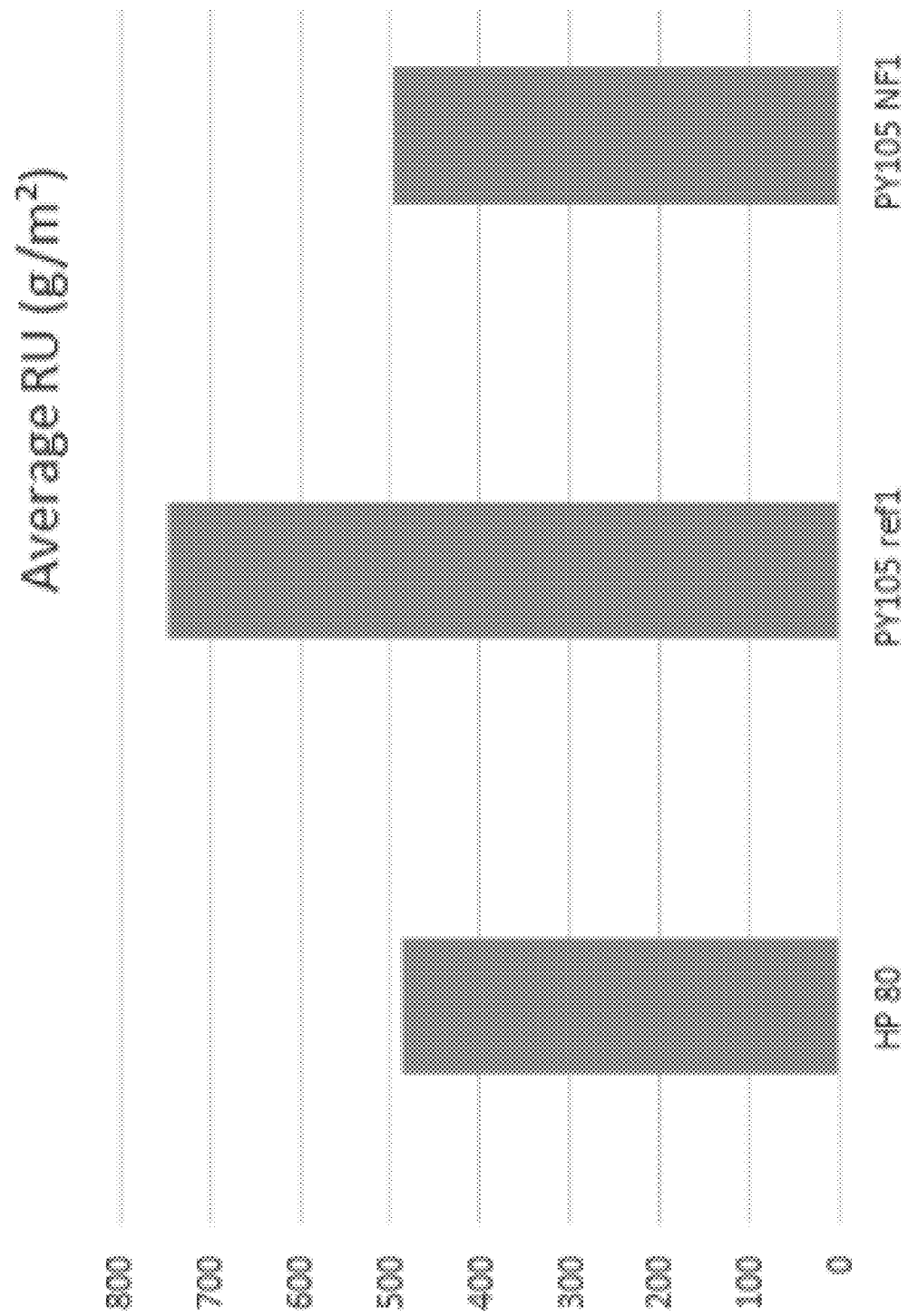
FIG. 1 illustrates the different resin absorption by a foam according to the state of the art (PY105 ref1), a foam according to the present invention (PY105 NF1) and an alternative product having a low average cell size without precision surface processing (HP80)

In the examples provided below, the various chemical-physical characteristics have been measured using the methods previously indicated.

Furthermore, the contact angle was measured with a 10× optical microscope, with a camera, according to the standard ASTM D7334-08 (2013).

The quantity of infused resin was measured using the same internal method.

Before Infusion

The dimensions and weight of the sheet or structural element of rigid polymer foam were accurately measured before infusion with the resin; the area of the sheet was recorded as A1 ($m^2$) and the weight as m1 expressed in grams.

Infusion According to the Internal Procedure

A sealing tape was applied on the perimeter of the sheet and the sheet was infused with a layer of removable non-stick film (peel-ply) and biaxial fiber fabric (plies biax), on each side of the core layer and with a drainage mesh (flow net) on the top of the core layer.

Vacuum containers and feeding tubes were used for feeding the resin.

In the examples, an epoxy bis-phenol A diglycidyl ether (CAS: 1675-54-3, trade-name Hexion RIMR 035c) was used, together with an amine catalyst (trade-name RIMH 037), which is a formulate based on 3-aminomethyl-3,5,5 trimethyl-cyclohexamine (CAS: 2855-13-2) and polyoxy-propylene diamine (CAS: 9046-10-0).

The infusion was carried out at a controlled temperature of 35° C. and under vacuum at 0.6-0.9 bars, for 15-30 minutes. The subsequent cross-linking was carried out at 60° C. for at least 10 hours. After the infusion, the non-stick film and the drainage mesh (peel-ply and flow net) were removed together with the excess parts of the resin on the infused sheet.

At the same time, the single biaxial fiber fabric (plies biax) was infused to determine its contribution to the total weight, and thus allow the calculation of the quantity of resin alone absorbed by the exposed surface cellularity.

After Infusion

The exact weight of the infused sheet m2, expressed in grams, was determined.

The contribution was calculated of the infused biaxial fiber fabric (biax plies) to the total weight as mbiax, expressed in grams.

The quantity of resin absorbed (RU) was then calculated as follows:

$$R=(m2-m1-mbiax)/A1$$

The quantity of absorbed resin R is expressed in ($g/m^2$).

Example 1 (Infusion and Resin Absorption)

The product HP 80 is a PVC polymer foam having an average cell size of 0.3 mm but which does not have a high surface quality, as it has been subjected to a sanding process with sandpaper.

The product PY105ref1 is a PET polymer foam having an average cell size of 0.6 mm, but which does not have a high surface quality, as it has been treated with sandpaper, so that the average depth of the exposed cellularity, i.e. the openings present on the surface of the polymer foam, is much greater than the average cell diameter.

The product PY105 NF1 is a PET polymer foam having an average cell size of 0.6 mm and which has the correct surface quality, as it has been treated with high-precision knife blade cutting, so that the average dimension of the depth of the exposed cellularity is lower than the average cell diameter.

The three rigid polymer foams indicated above were subjected to vacuum infusion, according to the internal lamination procedure, with the epoxy resin Hexion RIMR 035c, amine catalyst RIMH 037 and reinforcing fibers; the quantity of absorbed resin was measured according to the internal method indicated above, obtaining the results shown in table 1.

TABLE 1

| Core layer material | Absorbed resin ($g/m^2$) |
| --- | --- |
| HP80 | 487 |
| PY105 ref1 | 749 |
| PY105 NF1 | 493 |

The data indicated in Table 1 are also shown in FIG. 1 and clearly illustrate the different resin absorption by foams according to the state of the art and a foam according to the present invention.

In particular, it has been demonstrated that the presence of the correct average dimension of the depth of the exposed cellularity is necessary, preferably achieved by means of high-precision finishing, in order to obtain a correct and non-excessive resin absorption, for PET foams having an average cell size of 0.6 mm.

Furthermore, the average dimension of the depth of the exposed cellularity for PET foams, such as those of PY105 NF1, i.e. a foam according to the invention, allows an absorption of a non-excessive quantity of resin to be obtained, also in the case of a foam with a high cellularity (0.6 mm), i.e. a foam with a double exposed cellularity with respect to HP80 (0.3 mm): as shown by the data of Table 1, the resin absorption is completely analogous for HP80 (coarse processing) and PY105 NF1 (high-precision processing).

The same polymer foam, with the same average cell size, PY105 ref1, which does not have an average depth dimension of the exposed cellularity according to the invention (as demonstrated in the following example 3) and not subjected to high-quality and high-precision final processing, showed an absorption of an excessive quantity of resin.

Example 2 (Wettability and Contact Angle)

Figure 2:
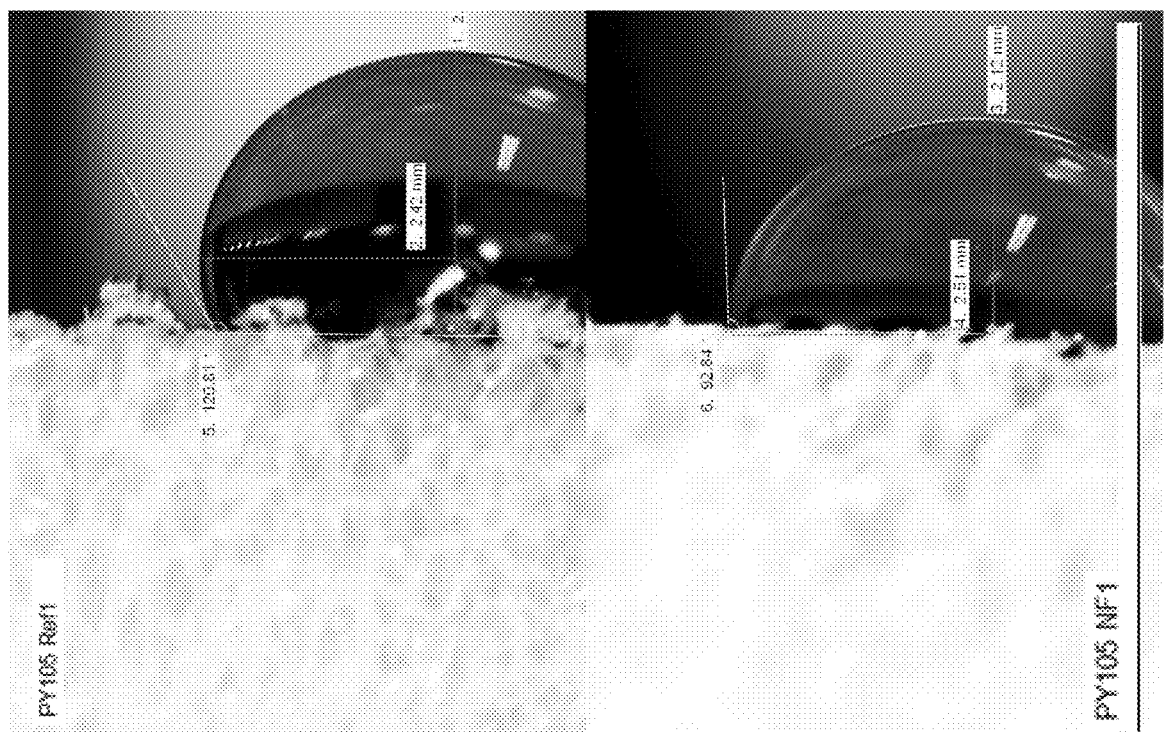
FIG. 2 shows the different wettability of a foam according to the state of the art (PY105 ref1, above) and a foam according to the present invention (PY105-NF1, below), with the measurement of the contact angle.

The rigid polymer foams PY105 NF1 and PY105 ref1, prepared as indicated in Example 1, i.e. with a high-precision final processing for PY105 NF1 (with knife blade cutting) and with a coarse-quality final processing (sanding with sandpaper) for PY105 ref1, and infused according to the internal lamination method, were evaluated in terms of wettability, as shown in FIG. 2.

The different wettability of a foam according to the state of the art (PY105 ref1, above) and a foam according to the present invention (PY105 NF1, below) demonstrates how the smoother surface of the foam PY105 NF1 allows a greater wettability, with a further positive effect on the reduction of the resin absorption.

More specifically, the evaluation was carried out by measuring the contact angle (according to the standard ASTM D7334) as an indication of wettability. In a surface with a high wettability for PET polymer foams, the contact angle is less than 105°, whereas in a surface with a low wettability for PET polymer foams, the contact angle is greater than 105°.

TABLE 2

|  | Hydrophilic | Hydrophobic |
| --- | --- | --- |
| Contact angle | Low | High |
| Wettability | Good | Poor |

The measurement of the contact angle, effected on the surface before lamination, is equal to 120.81° for the foam according to the state of the art (FIG. 2, PY105 ref1, above) and 92.84° for the foam according to the present invention (FIG. 2, PY105 NF1, below).

Figure 4:
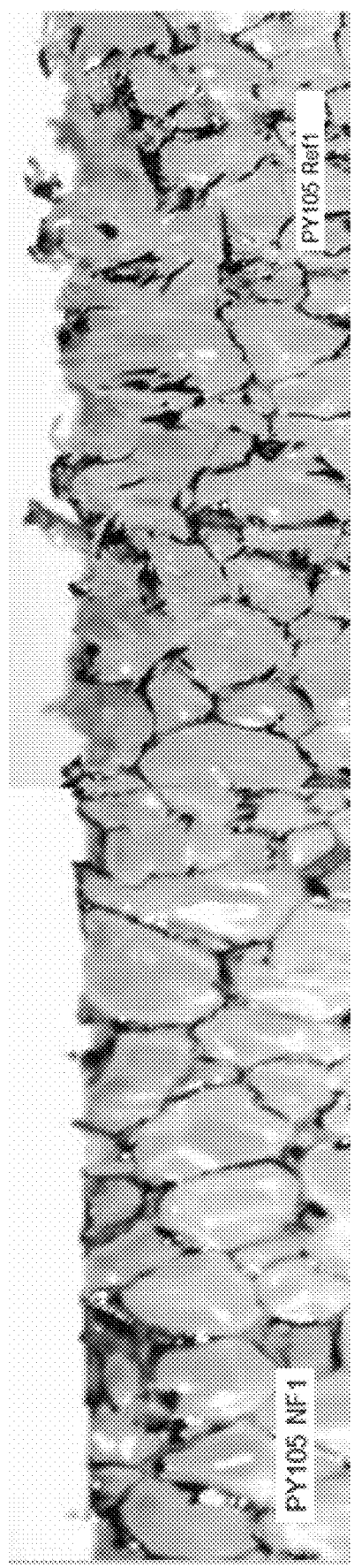
FIG. 4 shows the surface of a foam according to the present invention (PY105-NF, on the left in FIG. 4) and of a foam according to the state of the art (PY105 ref1, on the right in FIG. 4), before resin infusion.

FIG. 4 shows how the surface subjected to final processing with sandpaper (PY105 ref1, on the right) is of poor quality, with chipping and entrainments, and the surface subjected to high-precision final processing with knife cutting (PY105 NF1, on the left), is without striations and with a net sectioning of the cells.

Example 3 (Penetration Depth/Thickness of the Resin in the Foam)

Figure 3:
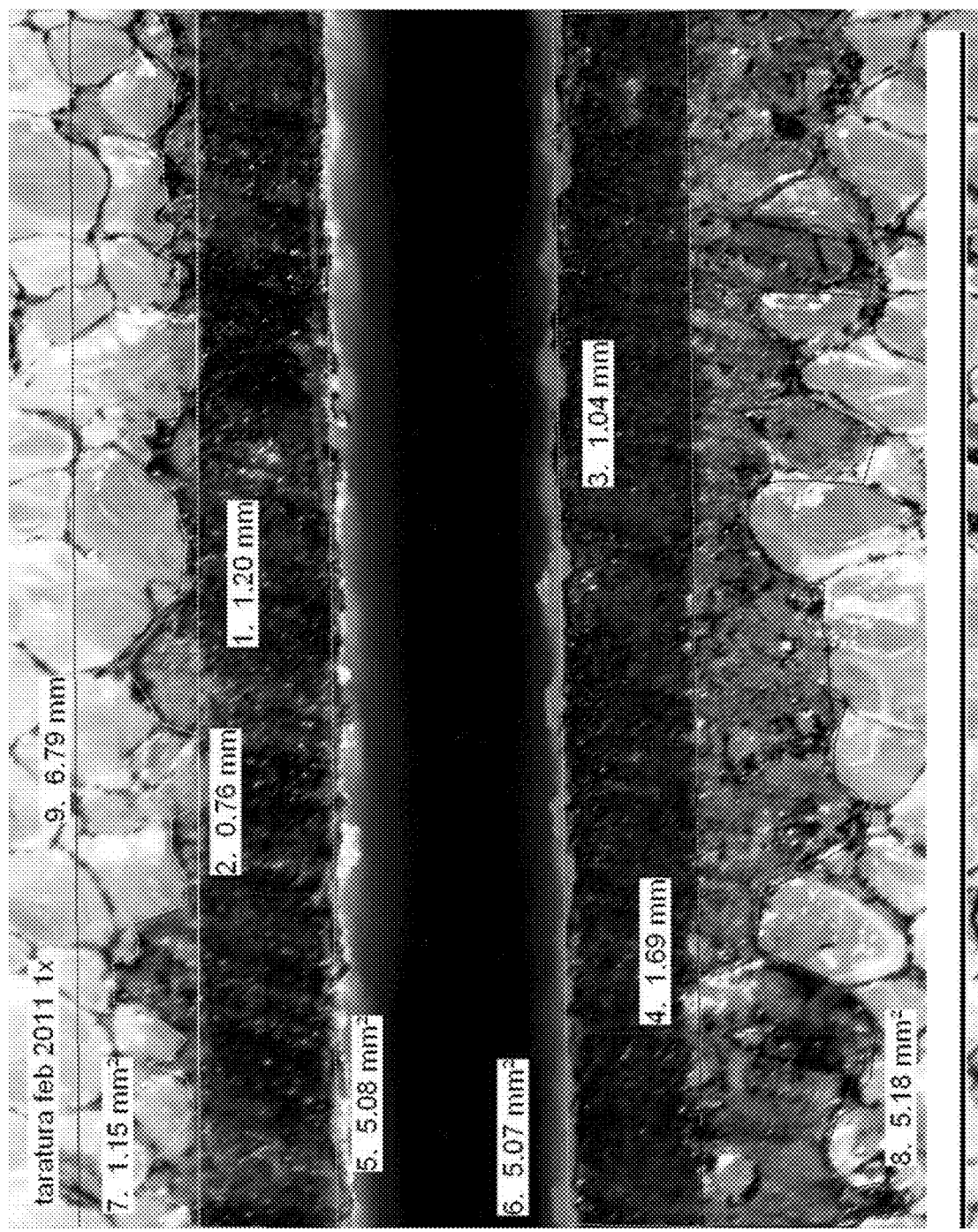
FIG. 3 shows how the infused foam has a greater penetration of the resin in the case of a foam according to the state of the art (PY105 ref1, below) and less in a foam according to the present invention (PY105-NF, above)

FIG. 3 shows how the infused foam undergoes a penetration of the resin inside the cells exposed on the surface, for a greater thickness/depth in the case of a foam according to the state of the art (PY105 ref1, below) with respect to a foam according to the present invention (PY105NF1, above).

More specifically, in FIG. 3, the area of the laminate (resin+fiber) that has been sectioned has a dimension of 5.08 mm$^2$: the width is equal to 6.79 mm, therefore the average thickness is equal to (5.08/6.79)=0.75 mm (±1 mm), attributed to the laminate (resin+fiber) alone without considering the penetration into the exposed volume of the foam.

The area of the resin penetrated inside the foam PY105 ref1, FIG. 3 below, i.e. the foam according to the state of the art, is equal to 5.18 mm$^2$: the width is equal to 6.79 mm, therefore the average thickness of the penetrated resin is equal to (5.18/6.79)=0.76 mm (±1 mm).

The area of the resin penetrated inside the foam according to the present invention, (PY105 NF1, FIG. 3 above, is equal to 1.15 mm$^2$: the width is equal to 6.79 mm, therefore the average thickness of the penetrated resin is equal to (1.15/6.79)=0.17 mm (±1 mm).

The width was evaluated considering the width of the sections (5-6-7-8) in FIG. 3 and, as indicated above, was used for the calculation of the average penetration thickness/height of the laminate (resin+fiber) alone and the average penetration thickness/height of the resin inside the surface volume, which depends on the surface cellularity and imprecision of the final processing.

The above data clearly show that the average thickness of the resin penetrated into the foam according to the present invention (PY105NF1, above) which is equal to 0.17 mm, is lower than the average cell size of 0.6 mm, whereas the average thickness of the resin penetrated into the foam according to the state of the art (PY105 ref1, below) which is equal to 0.76 mm, is greater than the average cell size of 0.6 mm.

In the case of PY105 ref1, the maximum thickness of the infused resin is equal to 1.69 mm. Consequently, as the thickness of the laminate (resin+fiber) alone is equal to 0.75 mm, it can be deduced that, with the surface processing process with sandpaper (PY105 ref1), the finishing surface imperfections always cause a penetration of the resin inside the surface that reaches a value of 0.94 mm, i.e. (1.69 mm-0.75 mm) i.e. much higher values than an average cell size (0.6 mm).

In the case of the foam according to the invention, PY105NF1, on the contrary, the overall thickness (resin+fiber+penetrated resin) ranges from a minimum value of 0 (0.75 mm) to a maximum value of 1.20 mm, showing that the maximum penetration depth of the resin inside the surface, in the exposed cellularity, is equal to 0.45 mm, i.e. (1.20 mm-0.75 mm), which is still lower than the average cell size of 0.6 mm.

The invention claimed is:

1. A polymer foam comprising:
    an unsealed surface,
    wherein the unsealed surface comprises a plurality of openings having depths with an average dimension not larger than an average cell size of the polymer foam, expressed as an average cell diameter of the polymer foam determined according to ISO28962001EANNEXA, and
    wherein the unsealed surface has a resin absorption from 450 to 600 g/m$^2$.

2. The polymer foam according to claim 1, wherein the average dimension of the depths of the openings present on the unsealed surface of the polymer foam is lower than the average cell size of the polymer foam, expressed as the average cell diameter.

3. The polymer foam according to claim 1, wherein the polymer foam is an expanded polymeric material based on polyethylene terephthalate (PET).

4. The polymer foam according to claim 1, wherein the unsealed surface of the polymer foam has a contact angle that is less than 105° determined according to ASTM D7334-08 (2013).

5. The polymer foam according to claim 1, wherein the average cell size of the polymer foam, expressed as the average cell diameter, ranges from 0.05 to 2 mm.

6. The polymer foam according to claim 1, wherein a density of the polymer foam ranges from 30 to 400 kg/m$^3$.

7. A structural element, adapted to be used as a core layer in a multilayer structural element, comprising:
    a polymer foam having an unsealed surface,
    wherein the unsealed surface of the polymer foam is charged with a resin and with reinforcing fibers and has an average dimension of a depth of openings present on the surface of the polymer foam not larger than an average cell size of the polymer foam, expressed as an average cell diameter of the polymer foam determined according to ISO28962001EANNEXA, and
    wherein the unsealed surface has a resin absorption from 450 to 600 g/m$^2$.

8. The structural element according to claim 7, wherein the unsealed surface of the polymer foam is charged by infusion.

9. The structural element according to claim 8, wherein a penetration depth of the resin infused in the unsealed surface of the polymer foam is not higher than the average cell size.

10. The structural element according to claim 7, wherein the resin is a polyester resin, a vinyl ester resin, an epoxy resins, or a phenolic resin.

11. The structural element according to claim 7, wherein the unsealed surface of the polymer foam has been subjected to a final processing treatment or surface finishing, carried out by processing the unsealed surface of the polymer foam with a high precision cutting, without tearing and keeping the openings on the surface intact before charging with the resin.

* * * * *